US008254600B2

(12) United States Patent
Oh et al.

(10) Patent No.: US 8,254,600 B2
(45) Date of Patent: Aug. 28, 2012

(54) METHOD AND AN APPARATUS FOR DECODING AN AUDIO SIGNAL

(75) Inventors: Hyen-O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 372 days.

(21) Appl. No.: 12/695,728

(22) Filed: Jan. 28, 2010

(65) Prior Publication Data

US 2010/0198602 A1 Aug. 5, 2010

Related U.S. Application Data

(60) Provisional application No. 61/148,049, filed on Jan. 28, 2009, provisional application No. 61/264,660, filed on Nov. 26, 2009.

(30) Foreign Application Priority Data

Jan. 27, 2010 (KR) ........................ 10-2010-0007635

(51) Int. Cl.
*H04B 1/00* (2006.01)
*H04B 1/20* (2006.01)
*H04R 5/00* (2006.01)
*G06F 17/00* (2006.01)
*G10L 19/00* (2006.01)

(52) U.S. Cl. ............ 381/119; 381/22; 700/94; 704/500; 369/4; 369/5

(58) Field of Classification Search .................. 381/119, 381/17, 18, 19–21, 22, 23; 700/94; 704/500–501; 369/1, 2–3, 4, 5, 6–12
See application file for complete search history.

(56) References Cited

U.S. PATENT DOCUMENTS

2008/0140426 A1 6/2008 Kim et al.
2008/0205657 A1 8/2008 Oh et al.
2008/0269929 A1 10/2008 Oh et al.
2009/0006106 A1 1/2009 Pang et al.

*Primary Examiner* — Vivian Chin
*Assistant Examiner* — Douglas Suthers
(74) *Attorney, Agent, or Firm* — Birch, Stewart, Kolasch & Birch, LLP

(57) ABSTRACT

The present invention relates to an apparatus for processing an audio signal and method thereof. The present invention includes receiving a downmix signal comprising plural objects, and a bitstream including object information and downmix gain information, obtaining level guide flag information for all frames indicating whether level guide information is present in the bitstream, obtaining the level guide information representing a limitation of object level applied to at least one object of the plural objects, from the bitstream, based on the level guide flag information, receiving mix information, generating modified mix information by modifying the mix information based on the level guide information and the downmix gain information, and generating at least one of downmix processing information and multi-channel information based on the modified mix information and the object information, wherein the mix information is estimated using object level for at least one object of the plural objects, and wherein the object information and the downmix gain information are determined when the downmix signal is generated.
Accordingly, the present invention is able to prevent distortion of a sound quality according to panning and/or gain adjustment in a manner of providing a limited rage for the panning and/or gain adjustment.

16 Claims, 16 Drawing Sheets

(a) (b)

(a) (a)

METHOD AND AN APPARATUS FOR DECODING AN AUDIO SIGNAL

CROSS-REFERENCE TO RELATED APPLICATIONS

This application claims the benefit of priority to U.S. Provisional Application No. 61/148,049, filed on Jan. 28, 2009, U.S. Provisional Application No. 61/264,660, filed on Nov. 26, 2009 and Korean application No. 10-2010-0007635, filed on Jan. 27, 2010, the contents of which are incorporated by reference herein in their entirety.

DESCRIPTION

1. Technical Field

The present invention relates to an apparatus for processing an audio signal and method thereof. Although the present invention is suitable for a wide scope of applications, it is particularly suitable for processing audio signals received via a digital medium, a broadcast signal and the like.

2. Background Art

Generally, in the process for downmixing an audio signal including a plurality of objects into a mono or stereo signal, parameters are extracted from the objects. These parameters are usable in decoding a downmixed signal. And, a panning and gain of each of the objects are controllable by a selection made by a user as well as the parameters.

DISCLOSURE OF THE INVENTION

Technical Problem

First of all, a panning and gain of objects included in a downmix signal can be controlled by a selection made by a user. However, in case that the pannings and gains of the objects, and more particularly, the gains of the objects are controlled by the user, sound quality may be distorted according to a gain control because since there is no guideline for the gain control or no limitation put on the gain control.

Secondly, in case that a user adjusts pannings and gains of objects, it is necessary to check a guideline for the panning and gain control or limitation put on the panning and gain control on a user interface.

Technical Solution

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which pannings and gains of objects can be controlled based on selections made by a user.

Another object of the present invention is to provide an apparatus for processing an audio signal and method thereof, by which pannings and gains of objects can be controlled based on selections made by a user within a predetermined limited range.

A further object of the present invention is to provide an apparatus for processing an audio signal and method thereof, by which, if pannings and gains of objects can be controlled based on selections made by a user, a guideline for a panning and gain control and/or limitation put on the panning and gain control can be checked on a user interface.

Advantageous Effects

Accordingly, the present invention provides the following effects and/or advantages.

First of all, the present invention is able to control gains and pannings of objects based on selections made by a user.

Secondly, in case that gains and pannings of objects are controlled, the present invention is able to prevent distortion of a sound quality according to panning and/or gain adjustment in a manner of providing a limited rage for the panning and/or gain adjustment.

Thirdly, in case that gains and pannings of objects are controlled, the present invention is able to prevent distortion of a sound quality according to panning and/or gain adjustment in a manner of displaying a guideline for a panning and gain control and/or limitation put on the panning and gain control can be checked on a user interface.

Fourthly, in case that gains and pannings of objects are controlled, the present invention enables a user to check whether the panning and gain adjustment of user-specific objects is actually performed in a manner of displaying a result of the adjustment on a user interface.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
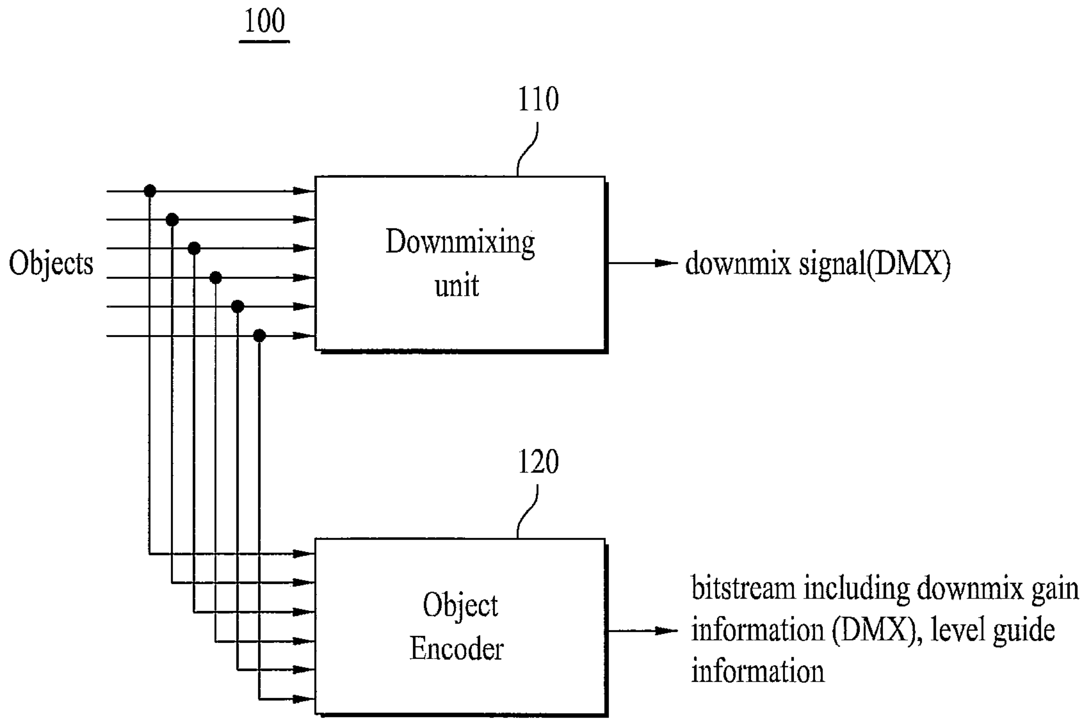
FIG. 1 is a diagram of an audio signal processing apparatus according to one embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for processing an audio signal, includes the steps of receiving a downmix signal comprising plural objects, and a bitstream including object information and downmix gain information, obtaining level guide flag information for all frames indicating whether level guide information is present in the bitstream, obtaining the level guide information representing a limitation of object level applied to at least one object of the plural objects, from the bitstream, based on the level guide flag information, receiving mix information, generating modified mix information by modifying the mix information based on the level guide information and the downmix gain information, and generating at least one of downmix processing information and multi-channel information based on the modified mix information and the object information, wherein the mix information is estimated using object level for at least one object of the plural objects, and wherein the object information and the downmix gain information are determined when the downmix signal is generated.

Preferably, the level guide flag information for all frames is obtained from a header of the bitstream.

Preferably, the method further comprises obtaining level guide flag information for each frame indicating whether level guide information is present in a frame data of the bitstream, wherein the level guide information is obtained from the frame data of the bitstream, and is to applied to a current frame corresponding to the frame data.

Preferably, the level guide information corresponds to fixed bit length, and the method further comprises de-quantizing the level guide information for all frames into a level guide parameter using a quantization table, wherein the modified mix information is generated by modifying the mix information based on the level guide parameter and the downmix gain information.

Preferably, the object information includes at least one of object level information and object correlation information, the downmixing processing information is to process the downmix signal without change of a number of channels, the multi-channel information includes at least one of channel level difference, inter channel correlation and channel prediction coefficient, the mix information is estimated using further object panning for all or a part of the at least one object, and the downmix gain information is a gain value applied to at least one object when the downmix signal is generated.

Preferably, the method further comprises generating a processed downmix signal using the downmix signal and the downmix processing information, and generating a multi-channel signal based on the processed downmix signal and the multi-channel information.

Preferably, the level guide information includes a common limitation applied to the all of the plural objects.

Preferably, the level guide information includes individual limitation applied to each of the plural objects.

To further achieve these and other advantages and in accordance with the purpose of the present invention, an apparatus for processing an audio signal comprises a receiving unit receiving a downmix signal comprising plural objects, and a bitstream including object information and downmix gain information, an extracting unit obtaining level guide flag information for all frames indicating whether level guide information is present in the bitstream, and obtaining the level guide information representing a limitation of object level applied to at least one object of the plural objects, from the bitstream, based on the level guide flag information, a rendering control unit receiving mix information, and generating modified mix information by modifying the mix information based on the level guide information and the downmix gain information, and an information generating unit generating at least one of downmix processing information and multi-channel information based on the modified mix information and the object information, wherein the mix information is estimated using object level for at least one object of the plural objects, and wherein the object information and the downmix gain information are determined when the downmix signal is generated.

Preferably, the level guide flag information for all frames is obtained from a header of the bitstream.

Preferably, the extracting unit further obtains level guide flag information for each frame indicating whether level guide information is present in a frame data of the bitstream, wherein the level guide information is obtained from the frame data of the bitstream, and is to applied to a current frame corresponding to the frame data.

Preferably, the level guide information corresponds to fixed bit length, and wherein the extracting unit de-quantizes the level guide information for all frames into a level guide parameter using a quantization table, wherein the modified mix information is generated by modifying the mix information based on the level guide parameter and the downmix gain information.

Preferably, the object information includes at least one of object level information and object correlation information, the downmixing processing information is to process the downmix signal without change of a number of channels, the multi-channel information includes at least one of channel level difference, inter channel correlation and channel prediction coefficient, the mix information is estimated using further object panning for all or a part of the at least one object, and the downmix gain information is a gain value applied to at least one object when the downmix signal is generated.

Preferably, the apparatus further comprises a downmix processing unit generating a processed downmix signal using the downmix signal and the downmix processing information; and, a multi-channel decoder generating a multi-channel signal based on the processed downmix signal and the multi-channel information.

Preferably, the level guide information includes a common limitation applied to the all of the plural objects.

Preferably, the level guide information includes individual limitation applied to each of the plural objects.

MODE FOR INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

The following terminologies in the present invention can be construed based on the following criteria and other terminologies failing to be explained can be construed according to the following purposes. Particularly, in this disclosure, 'information' in this disclosure is the terminology that generally includes values, parameters, coefficients, elements and the like and its meaning can be construed as different occasionally, by which the present invention is non-limited.

FIG. 1 is a diagram of an audio signal processing apparatus according to one embodiment of the present invention.

Referring to FIG. 1, an audio signal processing apparatus 100 according to one embodiment of the present invention mainly includes a downmixing unit 110 and an object encoder 120. A plurality of objects are inputted to the downmixing unit 110 to generate a mono or stereo downmix signal. Moreover, a plurality of the objects are inputted to the object encoder 120 to generate object information indicating attributes of the objects. The object information includes object level information indicating a level of object and object correlation information indicating inter-object correlation. In case that the downmix signal is a stereo signal, the object information includes an object gain ratio indicating a difference between gains each of which indicates an extent that the object is included in a corresponding channel (e.g., a left channel, a right channel, etc.) of the downmix signal. And, the object encoder 120 is able to additionally generate object gain information DMG indicating a gain applied to the object in case of generating the downmix signal. Moreover, the object encoder 120 is able to further generate level guide information, which will be explained in detail with reference to FIG. 2 later.

Besides, the object encoder 120 is able to generate a bitstream by multiplexing the object information, the downmix gain information, the level guide information and the like together.

Meanwhile, a multiplexer (not shown in the drawing) is able to generate one bitstream by multiplexing the downmix signal generated by the downmixing unit 110 and the parameter (e.g., object information, etc.) generated by the object encoder 120 together.

Figure 2:
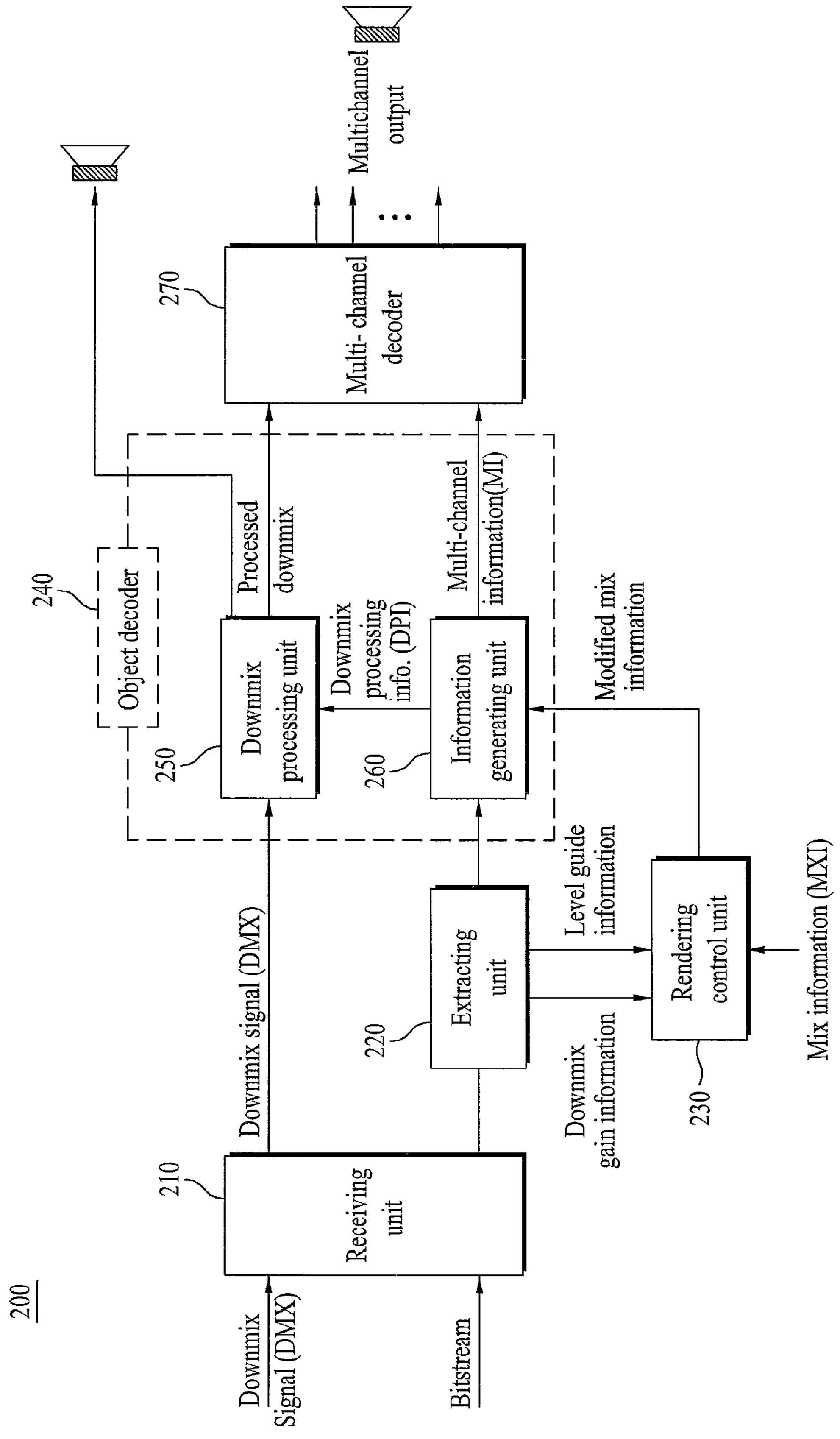
FIG. 2 is a block diagram of an audio signal processing apparatus according to an embodiment of the present invention.

FIG. 2 is a block diagram of an audio signal processing apparatus according to an embodiment of the present invention.

Referring to FIG. 2, an audio processing apparatus 200 according to the present invention includes a receiving unit 210, an extracting unit 220, a rendering control unit 230 and an object decoder 240 and is able to further include a multichannel decoder 270. The object decoder 240 can include a downmix processing unit 250 and an information generating unit 260.

The receiving unit 210 receives a downmix signal DMX including at least one object and also receives a bitstream including object information from the audio signal processing apparatus 100. In this case, the bitstream is able to further include downmix gain information and level guide information. In the drawing, shown is that the downmix signal and the bitstream are separately received. This is provided to help the understanding of the present invention. As mentioned in the foregoing description, the downmix signal can be transmitted by being included in one bitstream multiplexed with the downmix signal.

The extracting unit 220 extracts the downmix gain information and level guide information from the bitstream transmitted by the receiving unit 210. Details of the extracting unit 220 shall be described with reference to FIG. 4 later.

The rendering control unit 230 receives mix information MXI from a user interface (not shown in the drawing) and also receives the downmix gain information and level guide information extracted by the extracting unit 220. Details of the rendering control unit 230 shall be described with reference to FIG. 4 later.

The mix information is the information generated based on object position information, object gain information, playback configuration information and the like. In particular, the object position information is the information inputted by a user to control a position or panning of each object. And, the object gain information is the information inputted by a user to control a gain of each object. And, the playback configuration information is the information including the number of speakers, positions of speakers, ambient information (virtual positions of speakers) and the like. The playback configuration information is inputted by a user, is stored in advance, or can be received from another device.

The downmix gain information indicates a gain applied to an object in case of generating a downmix signal. And, the level guide information is the information indicating limitation of reproduction level for at least one object or limitation of object level. In this case, the limitation of object level is necessary to prevent a sound quality from being distorted in case that an object level is excessively boosted or suppressed. The limitation of object level can include a boost limitation value for avoiding a boost over a specific value and a suppression limitation value for avoiding a suppression over a specific value.

The level guide information is generated by the audio signal processing apparatus 200 by itself or can be defined in advance by a user. Yet, the present invention intends to describe a case that the level guide information is generated by an encoder.

The rendering control unit 230 generates modified mix information by modifying the mix information based on the level guide information and the downmix gain information. Details for this procedure shall be explained with reference to FIG. 11 later. The modified mix information is inputted to the information generating unit 260.

Meanwhile, referring to FIG. 2, the mix information is inputted by a user for example, by which the present invention is non-limited. Alternatively, the mix information includes the information inputted to the receiving unit 210 by being included in a bitstream or can include the information that is inputted externally and separately.

Meanwhile, the information generating unit 260 is able to generate at least one of downmix processing information and multichannel information based on the modified mix information. In particular, in a decoding mode (e.g., an output mode is mono, stereo or 3D (binaural) output), the information generating unit 260 generates downmix processing information. In case of a transcoding mode (e.g., an output mode is a multichannel mode), the information generating unit 260 is able to further generate multichannel information.

In this case, the downmix processing information (DPI) is the information for processing a downmix. In case of the decoding mode, the downmix processing information (DPI) is the information for generating a final output (e.g., PCM signal in time domain) by adjusting a level and/or panning of object. In case of the transcoding mode, the downmix processing information (DPI) may be the information for adjusting an object panning for a stereo downmix signal without changing the number of channels. In case of the transcoding mode and a mono downmix signal, the downmix processing information (DPI) is not generated and a downmix signal DMX can bypass the downmix processing unit 250.

Meanwhile, the multichannel information is the information for upmixing a downmix signal or a processed downmix signal. And, the multichannel information can include channel level information, channel correlation information and channel prediction coefficient.

In case that the downmix processing information (DPI) is generated by the information generating unit 260, the downmix processing unit 250 is able to generate a processed downmix signal using the downmix signal and the downmix processing information (DPI). In case of the aforesaid decoding mode, the processed downmix signal can include a PCM signal in time domain. In this case, the processed downmix signal is delivered as a final output signal to such an output device as a speaker instead of being delivered to the multichannel decoder 270.

The multichannel information is outputted to the multichannel decoder 270. Subsequently, the multichannel decoder 270 is able to finally generate a multichannel signal by performing upmixing using the processed downmix signal (in case of transcoding mode and stereo downmix) or the downmix signal DMX (in case of transcoding mode and mono downmix) and the multichannel information (MI).

Figure 3:
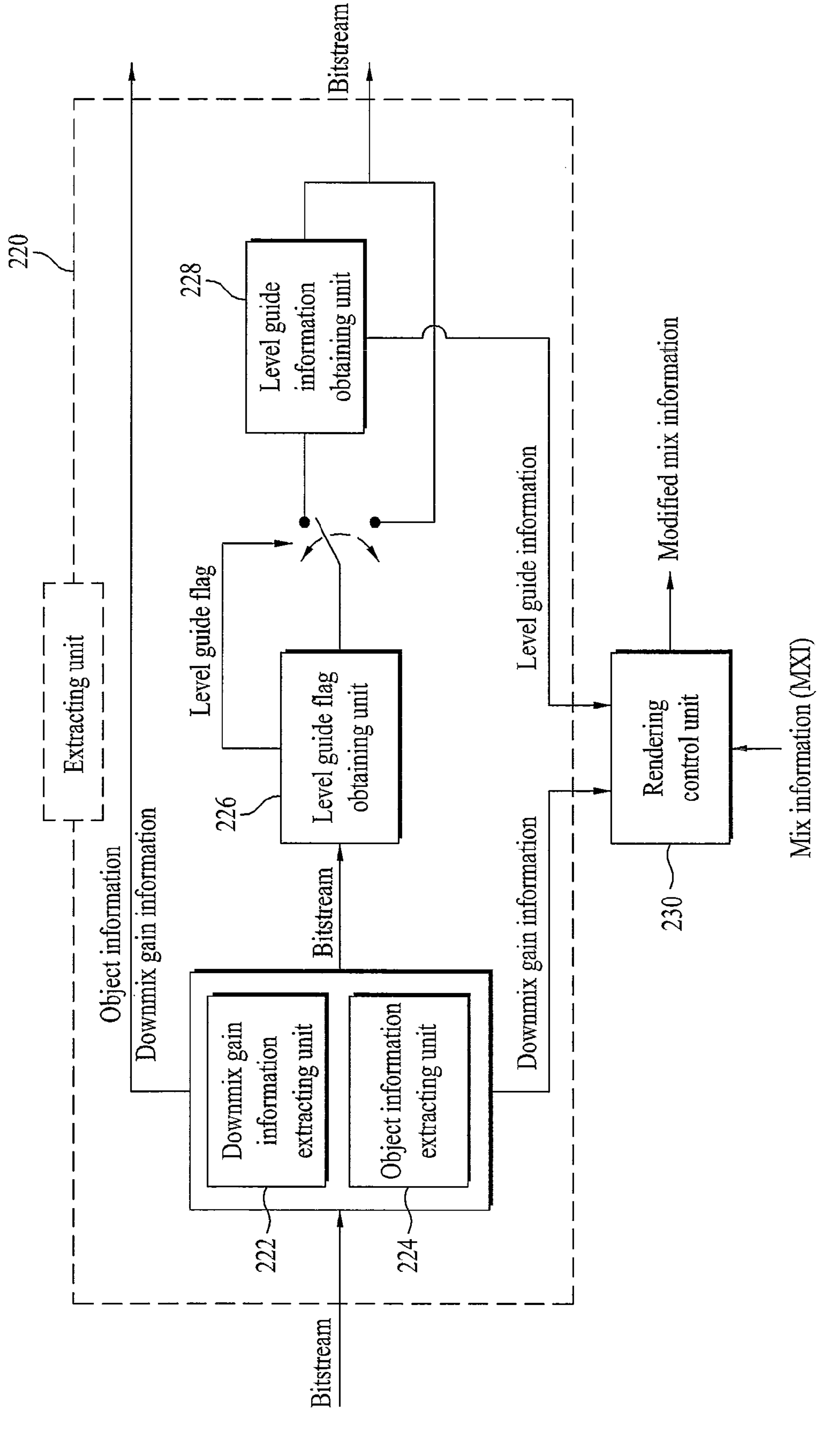
FIG. 3 is a detailed block diagram for a configuration of an extracting unit included in an audio signal processing apparatus according to an embodiment of the present invention.

FIG. 3 is a detailed block diagram for a configuration of an extracting unit included in an audio signal processing apparatus according to an embodiment of the present invention.

Referring to FIG. 3, an extracting unit 200 included in an audio signal processing apparatus according to an embodiment of the present invention represents a detailed configuration of the extracting unit 220 described with reference to FIG. 2. And, the extracting unit 200 includes a downmix gain information extracting unit 222, an object information extracting unit 224, a level guide flag obtaining unit 226, a level guide information obtaining unit 228 and a rendering control unit 230.

The downmix gain information extracting unit 222 extracts downmix gain information included in the bitstream received from the receiving unit 210 described with reference to FIG. 2. In this case, as mentioned in the foregoing description, the downmix gain information is the information indicating a gain applied to each object included in a downmix signal.

The object information extracting unit 224 extracts object information from the received bitstream. In this case, as mentioned in the foregoing description, the object information can include object level information, object correlation information and the like.

The level guide flag obtaining unit 226 obtains a level guide flag from the received bitstream. In particular, the level guide flag can include a level guide flag for entire frames and a level guide flag for each frame. The level guide flag for the entire frames indicates whether the level guide information is included in the bitstream. This flag can be included in a header of the bitstream. Meanwhile, the level guide flag information for each frame indicates whether the level guide information exists in frame data of a bitstream. And, this flag can be included in a header of the bitstream as well.

According to the flag obtained by the level guide flag obtaining unit 226, a bitstream is introduced into the level guide information obtaining unit 228. If the flag indicates that the level guide information is included within the received bitstream (e.g., if a value of the flag is set to 1), the bitstream is introduced into the level guide information obtaining unit 228.

On the contrary, if the flag indicates that the level guide information is not included within the received bitstream (e.g., if a value of the flag is set to 0), the received bitstream bypasses the level guide information obtaining unit 228.

In case that the level guide flag indicates that the level guide information is included in the bitstream, the level guide information obtaining unit 228 obtains the level guide information from the bitstream. In this case, the level guide information can correspond to entire frames or a specific frame only, of which details shall be explained with reference to FIG. 7 later.

The rendering control unit 230 obtains the downmix gain information from the downmix gain information obtaining unit 220, obtains mix information from a user interface (not shown in the drawing), and obtains the level guide information from the level guide information obtaining unit 228. Based on the level guide information, the rendering control unit 230 generates modified mix information by modifying the mix information. The modified mix information is then delivered to the information generating unit 260 described with reference to FIG. 2.

The level guide information is the information indicating limitation of reproduction level for at least one object and is able to include a range for a gain adjustment of an object for example. In this case, the range can be set to a limitation value such as an upper bound, a lower bound and the like, by which the present invention is non-limited.

The limitation value can correspond to an absolute gain value for a specific object. For instance, in an object signal including 2 objects (object A, object B), a gain adjustment range of the object A (e.g., vocal object) is set within 6 dB and a gain adjustment value of the object B (e.g., guitar object) can be set within 12 dB. This will be explained in detail with reference to FIG. 8 later.

Figure 4:
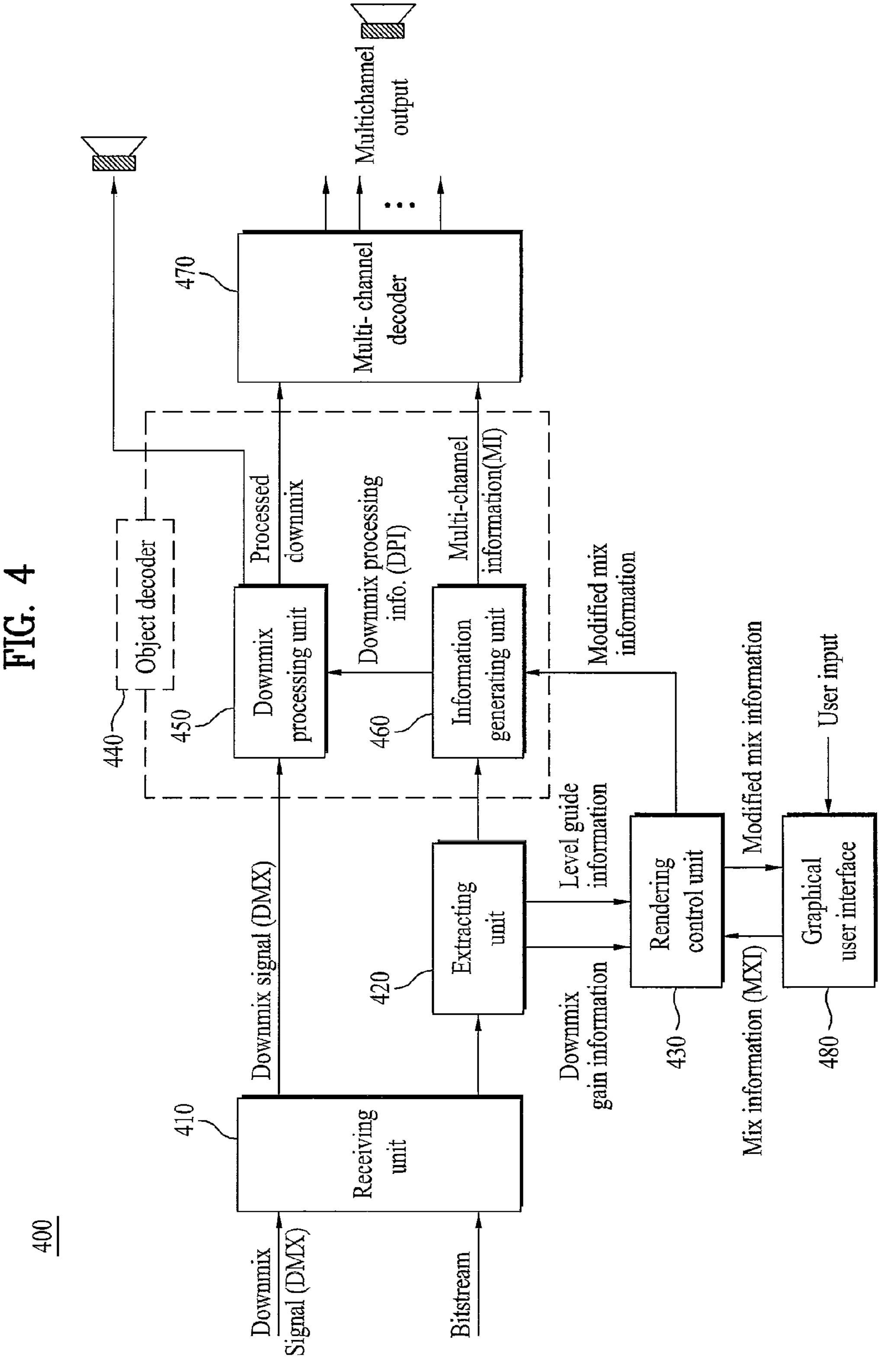
FIG. 4 is a block diagram for a configuration of an audio signal processing apparatus including a graphic user interface according to one embodiment of the present invention.

FIG. 4 is a block diagram for a configuration of an audio signal processing apparatus including a graphic user interface according to one embodiment of the present invention.

Referring to FIG. 4, an audio signal processing apparatus 400 according to one embodiment of the present invention is able to further include a graphic user interface 480 in addition to the former audio signal processing apparatus 200 described with reference to FIG. 2.

A receiving unit 410, an extracting unit 420, a rendering control unit 430, an object decoder 440, a downmix processing unit 450, an information generating unit 460 and a multichannel decoder 470 in FIG. 4 have the same configurations and functions of the identically-named components shown in FIG. 2, respectively, of which details are omitted from the following description for clarity.

The graphic user interface 480 receives a user input for adjusting a level of at least one object. Mix information estimated according to the user input is then inputted to the rendering control unit 430.

As mentioned in the foregoing description, the rendering control unit 430 is able to generate modified mix information in a manner of modifying the mix information based on level guide information. And, the graphic user interface 480 is able to display representation corresponding to the modified mix information.

The user input via the graphic user interface 480 and the modified mix information displaying method shall be described in detail with reference to FIG. 11 later.

Figure 5:
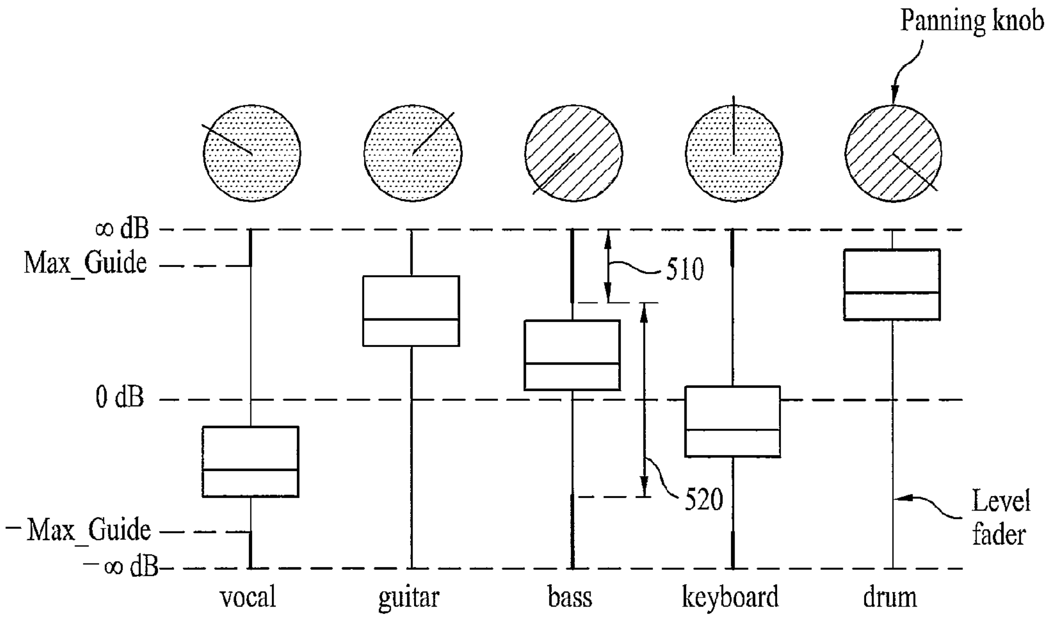
FIG. 5 is a diagram for a method of displaying level guide information using a graphic user interface according to one embodiment of the present invention.

FIG. 5 is a diagram for a method of displaying level guide information using a graphic user interface according to one embodiment of the present invention.

Referring to FIG. 5, a graphic user interface displays representation corresponding to level guide information indicating rendering limitation for at least one of a plurality of objects included in a downmix signal. In this case, the representation can include a non-recommended rendering region representing the rendering limitation and a recommended rendering region representing a rendering range except the rendering limitation.

Moreover, the graphic user interface additionally displays a level fader for receiving the user input for controlling a level of at least one of a plurality of the objects. In this case, the representation corresponding to the level guide information can be displayed in association with the level fader.

The level fader operates along a straight line or a curve. Each of the non-recommended rendering region and the recommended rendering region can be displayed on the straight line or the curve. And, the level fader is operable within the recommended rendering region.

FIG. 5 shows that the level fader is operating along the straight line, by which the present invention is non-limited. A shape (or style) of the recommended rendering region is different from that of the non-recommended rendering region. Namely, the shape can include at least one of color, brightness, texture and pattern for example.

Referring to FIG. 5, if a bass object is described for example, the recommended rendering region 510 is represented as a green line, while the non-recommended rendering region 520 can be represented a red line.

The present invention discriminates the shapes of the recommended and non-recommended rendering regions with reference to color, by which the present invention is non-limited. As mentioned in the foregoing description, the present invention can include all cases of enabling visual discrimination with reference to brightness, texture, pattern and the like.

In case of adjusting gains and pannings of objects, and more particularly, the gains of the objects, a user is able to check a limited range for a gain adjustment based on the representation corresponding to the level guide information. Therefore, it is able to prevent a sound quality from being distorted according to the panning adjustment and/or the gain adjustment.

Figure 6:
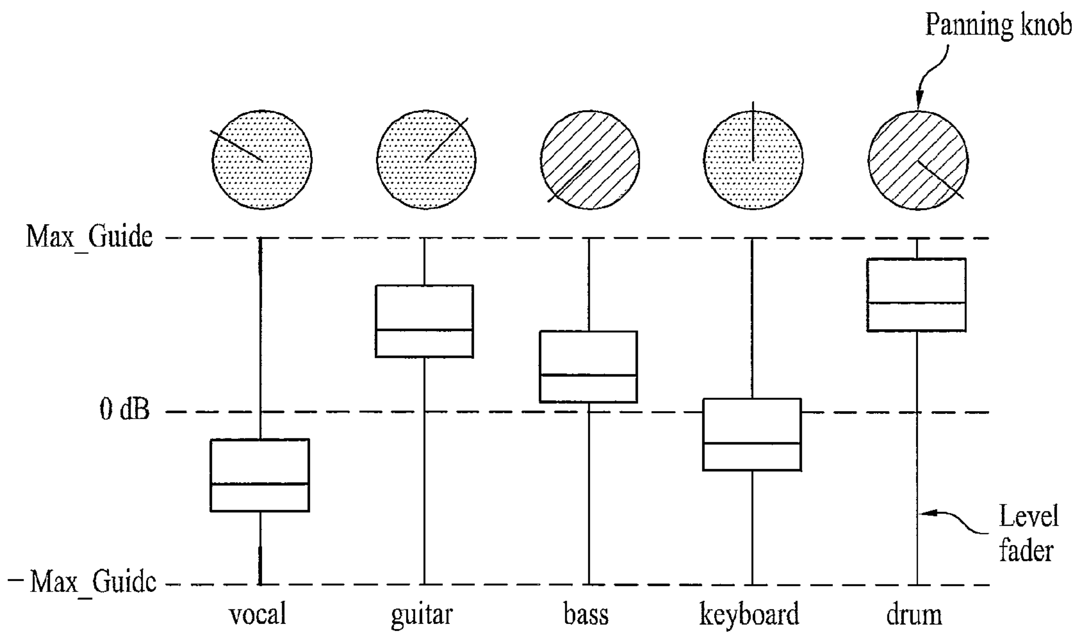
FIG. 6 is a diagram for a method of displaying level guide information using a graphic user interface according to another embodiment of the present invention.

FIG. 6 is a diagram for a method of displaying level guide information using a graphic user interface according to another embodiment of the present invention.

The displaying method shown in FIG. 5 provides the limited range for the gain adjustment only but does not put limitation on the gain adjustment not to deviate from the range. Therefore, a sound quality may be distorted according to the gain adjustment conducted by the user.

Referring to FIG. 6, in order to prevent the above problem, upper and lower bounds of the level fader are displayed. And, a user is made not to deviate from a limited range for gain adjustment based on level guide information. Therefore, it is able to prevent a sound quality from being distorted according to a gain adjustment conducted by a user.

The above-described mix information estimated by the user input can be inputted as a rendering matrix shown in Formula 1. In the rendering matrix shown in Formula 1, each row indicates each channel of an input signal and each column indicates each object included in the input signal. Hence, a size of each object outputted from each channel can be determined according to the matrix.

In particular, an output of an $i^{th}$ one of N objects in a rendering matrix can be estimated via Formula 2.

$$M_{ren}=\begin{bmatrix} m_{0,Lf} & \Lambda & m_{N-1,Lf} \\ m_{0,Rf} & \Lambda & m_{N-1,Rf} \\ m_{0,C} & \Lambda & m_{N-1,C} \\ m_{0,Lfe} & \Lambda & m_{N-1,Lfe} \\ m_{0,Ls} & \Lambda & m_{N-1,Ls} \\ m_{0,Rs} & \Lambda & m_{N-1,Rs} \end{bmatrix} \quad \text{[Formula 1]}$$

$$L_{i,input}=10\log10\left(\sum_{ch} m_{i,ch}^2\right) \quad \text{[Formula 2]}$$

Level guide information is the information that indicates limitation of reproduction level for at least one object and is also a relative value to downmix gain information. Therefore, the aforesaid modified mix information can be represented as Formula 3.

$$L_{i,limited}=\begin{cases} L_{i,GainGuide}+L_{i,downmix}, & L_{i,input}-L_{i,downmix}>L_{i,GainGuide} \\ -L_{i,GainGuide}+L_{i,downmix}, & L_{i,input}-L_{i,downmix}<-L_{i,GainGuide} \\ L_{i,input}, & |L_{i,input}-L_{i,downmix}|\le L_{i,GainGuide} \end{cases} \quad \text{[Formula 3]}$$

In Formula 3, it is $L_{i,downmix}=DMG_i$, and $DMG_i$ is downmix gain information that is not quantized.

Finally, the modified mix information can be derived into a rendering matrix represented as Formula 4.

$$M_{ren,limited}=\sqrt{\frac{L_{i,limited}}{L_{i,input}}}\begin{bmatrix} m_{0,Lf} & \Lambda & m_{N-1,Lf} \\ m_{0,Rf} & \Lambda & m_{N-1,Rf} \\ m_{0,C} & \Lambda & m_{N-1,C} \\ m_{0,Lfe} & \Lambda & m_{N-1,Lfe} \\ m_{0,Ls} & \Lambda & m_{N-1,Ls} \\ m_{0,Rs} & \Lambda & m_{N-1,Rs} \end{bmatrix} \quad \text{[Formula 4]}$$

Moreover, in case that the mix information is inputted not as a matrix but as level value ($L_{i,input}$) and panning value ($P_{i,input}$), it is facilitated to guide and/or limit the mix information. In particular, assuming that the modified mix information includes total energy corresponding to an output level expected value for an object included in an input signal, a process for modifying the mix information can be represented as Formula 5.

$$L_{i,limited} = \begin{cases} L_{i,GainGuide}, & L_{i,input} > L_{i,GainGuide} \\ -L_{i,GainGuide}, & L_{i,input} < -L_{i,GainGuide} \\ L_{i,input}, & |L_{i,input}| \le L_{i,GainGuide} \end{cases}$$ [Formula 5]

Moreover, it is able to calculate the matrix shown in Formula 1 using the guided or limited level value ($L_{i,limited}$) and the inputted panning value ($P_{i,input}$).

An audio signal of the present invention is encoded by an encoder into a downmix signal including a plurality of objects and a bitstream including object information and downmix gain information. They are then transmitted as one bitstream or separate bitstreams to a decoder.

Meanwhile, the bitstream can include level guide information indicating rendering limitation on at least one of a plurality of the objects and level guide flag information indicating whether the level guide information exists in the bitstream.

The level guide flag can be carried on such a syntax as Table 1.

TABLE 1

| Level guide flag (bsExtIndRgiFlag) | Meaning |
|---|---|
| 0 | Level guide information exists in bitstream |
| 1 | Level guide information does not exist in bitstream |

Meanwhile, the level guide information is transmitted as one information in common to all objects or can be transmitted as information applied to each object.

Table 2 shows level guide attribute information indicating whether level guide information is the information applied to each object and the meaning of the level guide attribute information.

TABLE 2

| Level guide attribute information (bsIndRgiFlag) | Meaning |
|---|---|
| 0 | Level guide information is in common to all objects |
| 1 | Level guide information is applied to each object |

Meanwhile, the level guide information is included in the configuration information region of the bitstream and is then applied in common to all data regions located behind. Alternatively, the level guide information is included in each of a plurality of the data regions and is then applicable to each of the data regions individually.

Figure 7:
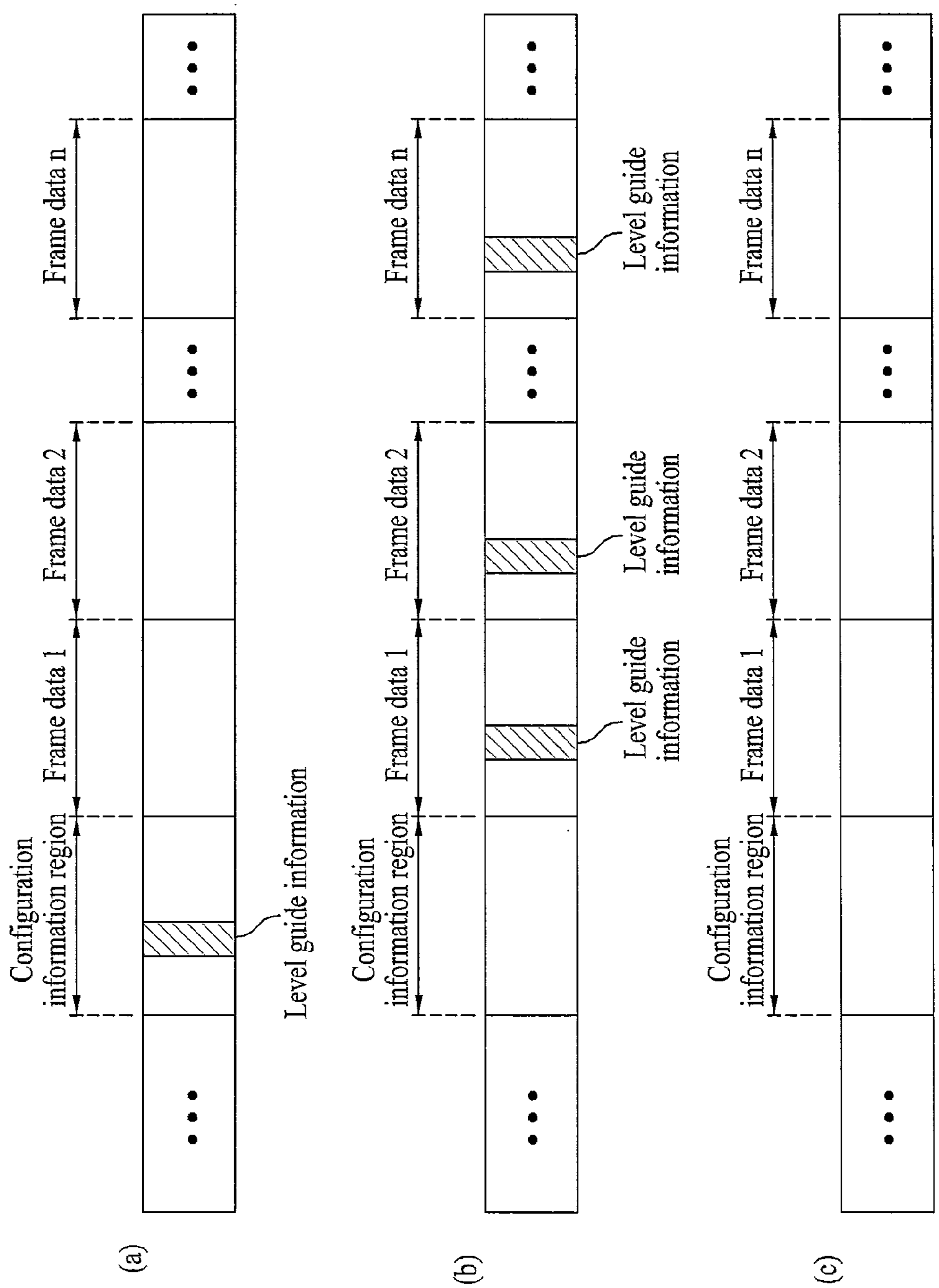
FIG. 7 is a diagram for indicting whether level guide information exists in a bitstream and also indicating a position of the level guide information in the bitstream.

FIG. 7 is a diagram for indicting whether level guide information exists in a bitstream and also indicating a position of the level guide information in the bitstream. The following description is made for position and target of level guide information with reference to FIG. 7. In FIG. 7, (a) or (b) corresponds to a case that level guide information is included in a bitstream, while (c) correspond to a case that level guide information is not included in a bitstream.

First of all, referring to (a) of FIG. 7, level guide information is included in a configuration information region of a bitstream. In this case, the configuration information region can correspond to a header including such information applied in common to a frame as a sampling rate, a frequency resolution, a frame length and the like. In this case, the level guide information extracted from the configuration information region is identically applied to all data regions of a downmix signal or all frames.

On the contrary, referring to (b) of FIG. 7, level guide information is included in a data region or frame data. In this case, the level guide information extracted from the corresponding data region is applied to a current frame corresponding to the frame data to put limitation on adjusting pannings and gains of objects.

In case that level guide information is included in a configuration information region, the level guide information can be called 'static'. In this case, the level guide information is identically applied to all data regions in common.

On the contrary, if level guide information is included in a data region of a bitstream, the level guide information can be called 'dynamic'. In this case, the level guide information is applied to a corresponding data region only, whereby pannings and gains of objects included in a downmix signal in a corresponding data region can be adjusted.

In an audio signal processing method according to the present invention, level guide information may be the information for determining a limited range (upper or lower bound) for adjusting gains of objects. In particular, if the level guide information is set to 3 dB, it is able to adjust a gain of object up to 3 dB. If the level guide information is set to 12 dB, it is able to adjust a gain of object up to 12 dB.

Yet, the level guide information according to the present invention is non-limited by the information for determining a limited range for adjusting gains of objects. For instance, level guide information according to the present invention may include information determined at a ratio of a user input for adjusting gains of objects.

In particular, in case that a user adjusts a gain of object by 10 dB, it may put limitation on 10 dB all or 5 dB amounting to 50% of 10 dB, or may put no limitation.

As mentioned in the foregoing description, the level guide information according to the present invention may differ in its meaning but has the same purpose of putting limitation on adjusting gains of objects. Therefore, the present invention is non-limited by the above descriptions.

Figure 8:
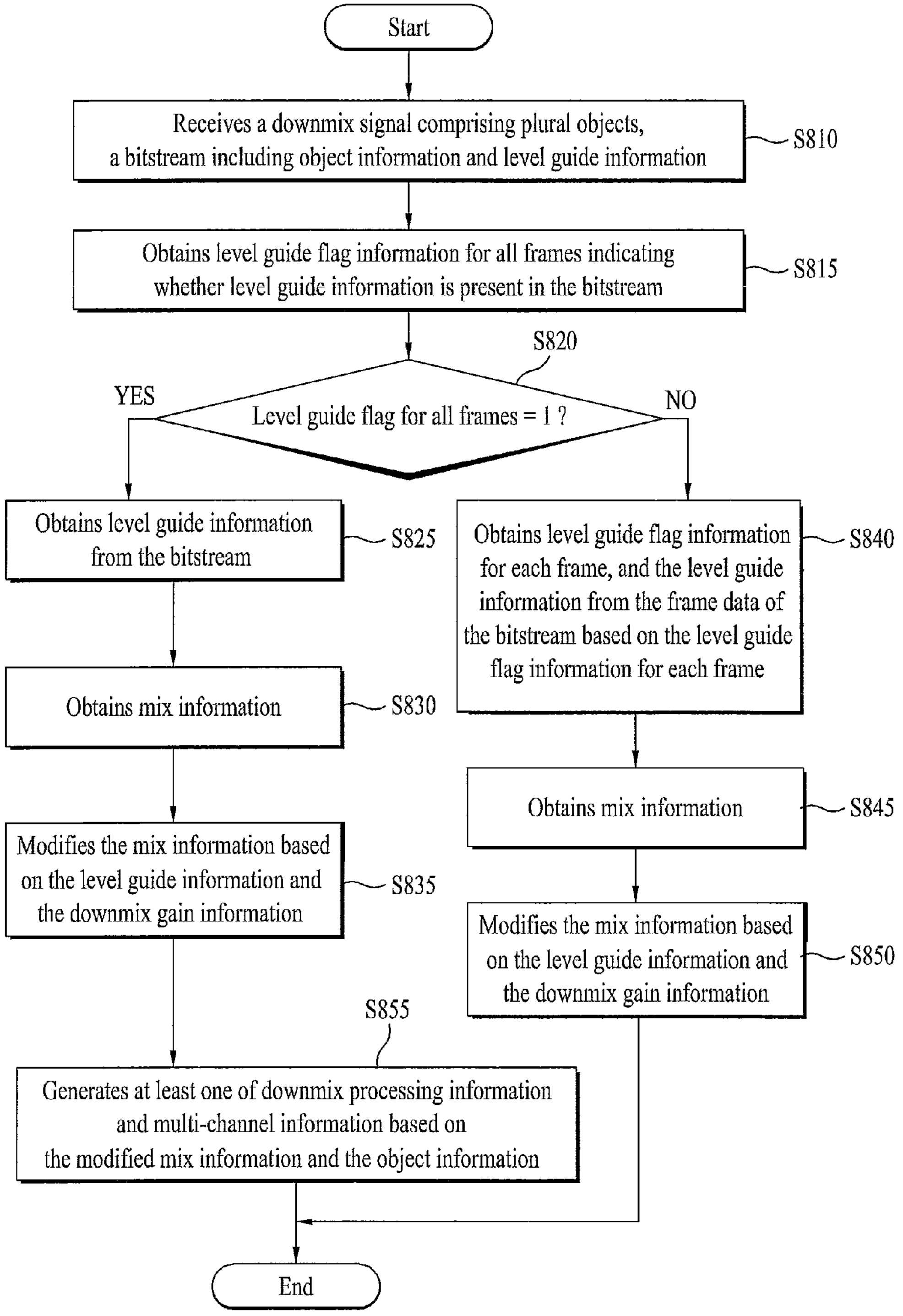
FIG. 8 is a flowchart for an audio signal processing method according to one embodiment of the present invention.

FIG. 8 is a flowchart for an audio signal processing method according to one embodiment of the present invention.

Referring to FIG. 8, an audio signal processing method according to one embodiment of the present invention includes the following steps.

First of all, a bitstream, which includes a downmix signal containing a plurality of objects and a bitstream containing object information and downmix gain information, is received [S810].

Subsequently, level guide flag information on all frames indicating whether level guide information is present in the bitstream is obtained [S815].

If the level guide flag for all frames is set to 1 [S820], the level guide information is obtained from the bitstream [S825] and mix information is then obtained [S830].

Subsequently, mix information is modified based on the obtained level guide information and downmix gain information [S835]. Based on the modified mix information and the object information, at least one of downmix processing information and multichannel information is generated [S855].

Meanwhile, if the level guide flag is not set to 1 [S820], level guide flag information on each frame for indicating whether level guide information exists in frame data of the bitstream, the level guide information is obtained from the frame data of the bitstream based on the level guide flag information on the each frame [S840], and mix information is obtained [S845]. Meanwhile, the level guide information is applied to a current frame corresponding to the frame data.

Subsequently, mix information is modified based on the obtained level guide information and downmix gain information [S850]. Based on the modified mix information and the object information, at least one of downmix processing information and multichannel information is generated [S855].

Figure 9:
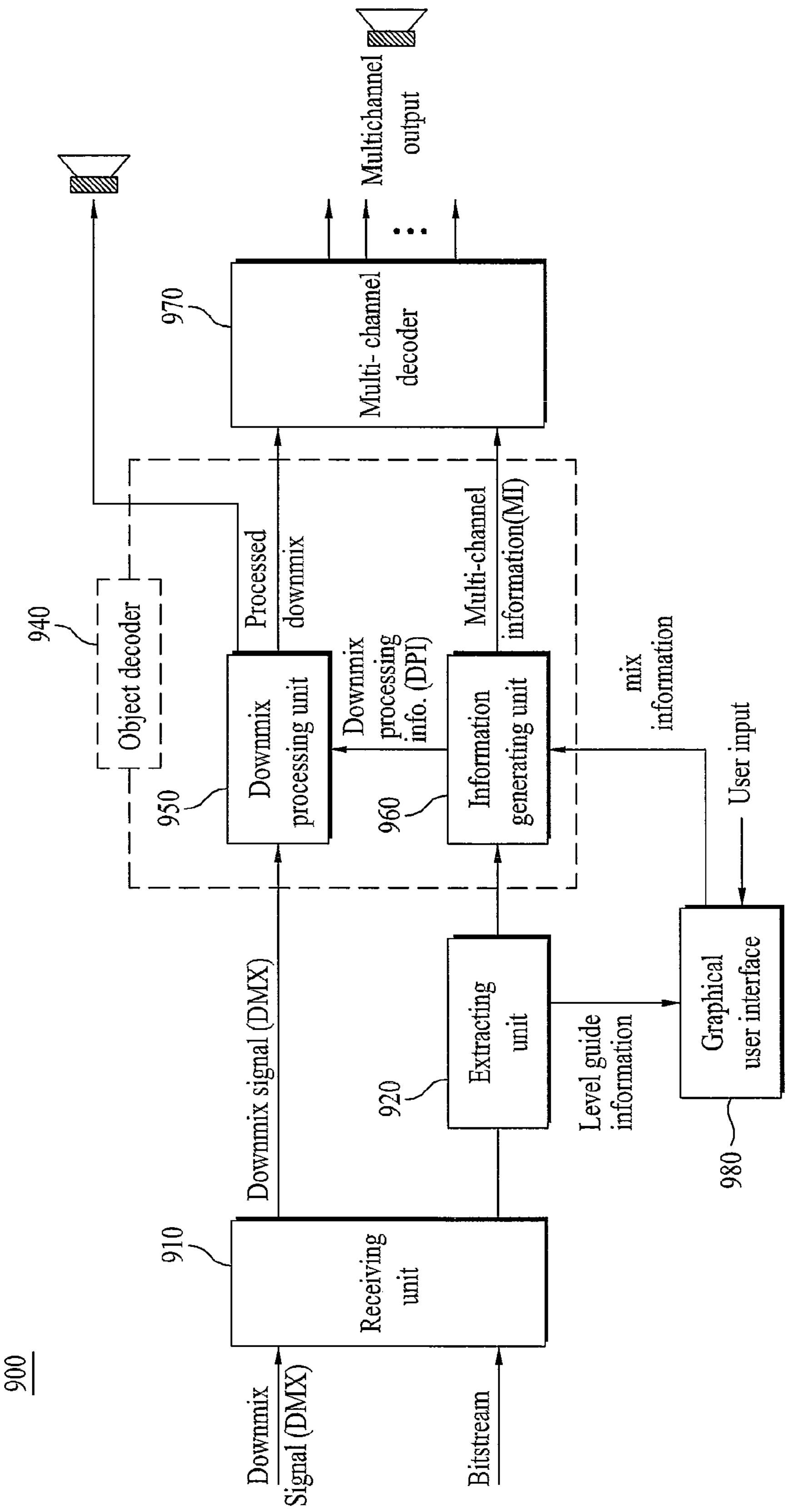
FIG. 9 is a block diagram for a configuration of an audio signal processing apparatus including a graphic user interface configured to display representation corresponding to level guide information according to one embodiment of the present invention.

FIG. 9 is a block diagram for a configuration of an audio signal processing apparatus including a graphic user interface configured to display representation corresponding to level guide information according to one embodiment of the present invention.

Referring to FIG. 9, an audio signal processing apparatus 900 including a graphic user interface configured to display representation corresponding to level guide information according to one embodiment of the present invention has the same-configuration of the former audio signal processing apparatus described with reference to FIG. 4.

Therefore, a receiving unit 910, an extracting unit 920, an object decoder 940, a downmix processing unit 950, an information generating unit 960 and a multichannel decoder 970 have the same configurations of the identically-named components shown in FIG. 4, of which details are omitted from the following description.

As mentioned in the foregoing description with reference to FIG. 5, a graphics user interface 980 is able to display representation corresponding to level guide information indicating rendering limitation on at least one of a plurality of objects included in a downmix signal. Moreover, the graphic user interface 980 is able to display level guide information received from the extracting unit 920.

Yet, since the audio signal processing apparatus 900 does not include the rendering control unit 430 included in the former audio signal processing apparatus 400, the graphic user interface 980 receives a user input for controlling a level for at least one of a plurality of the objects and outputs mix information estimated by the user input to the information generating unit 960 only but is unable to modify the mix information based on the level guide information via the rendering control unit 430.

Figure 10:
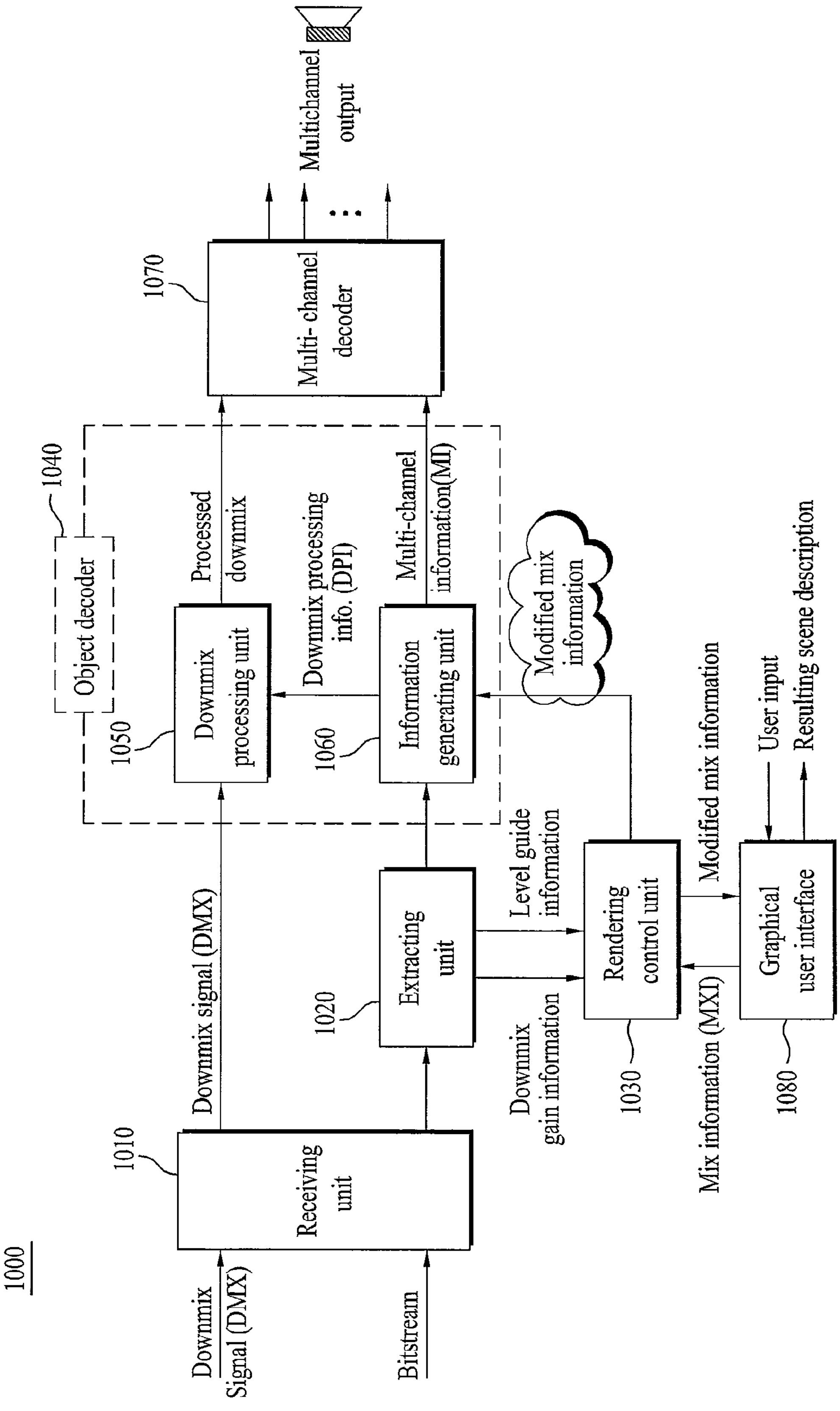
FIG. 10 is a block diagram for a configuration of an audio signal processing apparatus including a graphic user interface according to another embodiment of the present invention.

FIG. 10 is a block diagram for a configuration of an audio signal processing apparatus including a graphic user interface according to another embodiment of the present invention.

Referring to FIG. 10, an audio signal processing apparatus 1000 including a graphic user interface configured to display representation corresponding to level guide information according to one embodiment of the present invention has the same configuration of the former audio signal processing apparatus described with reference to FIG. 4.

Therefore, a receiving unit 1010, an extracting unit 1020, a rendering control unit 1030, an object decoder 1040, a downmix processing unit 1050, an information generating unit 1060, a multichannel decoder 1070 and a graphic user interface 1080 in FIG. 10 have the same configurations and functions of the identically-named components shown in FIG. 4, respectively, of which details are omitted from the following description for clarity.

Referring to FIG. 10, the graphic user interface 1080 receives a user input for adjusting a level of at least one object. Mix information estimated by the user input is then inputted to the rendering control unit 1030.

Meanwhile, the rendering control unit 1030 is able to generate modified mix information by modifying the mix information based on level guide information. And, the graphic user interface 1080 is able to display representation corresponding to the modified mix information.

Figure 11:
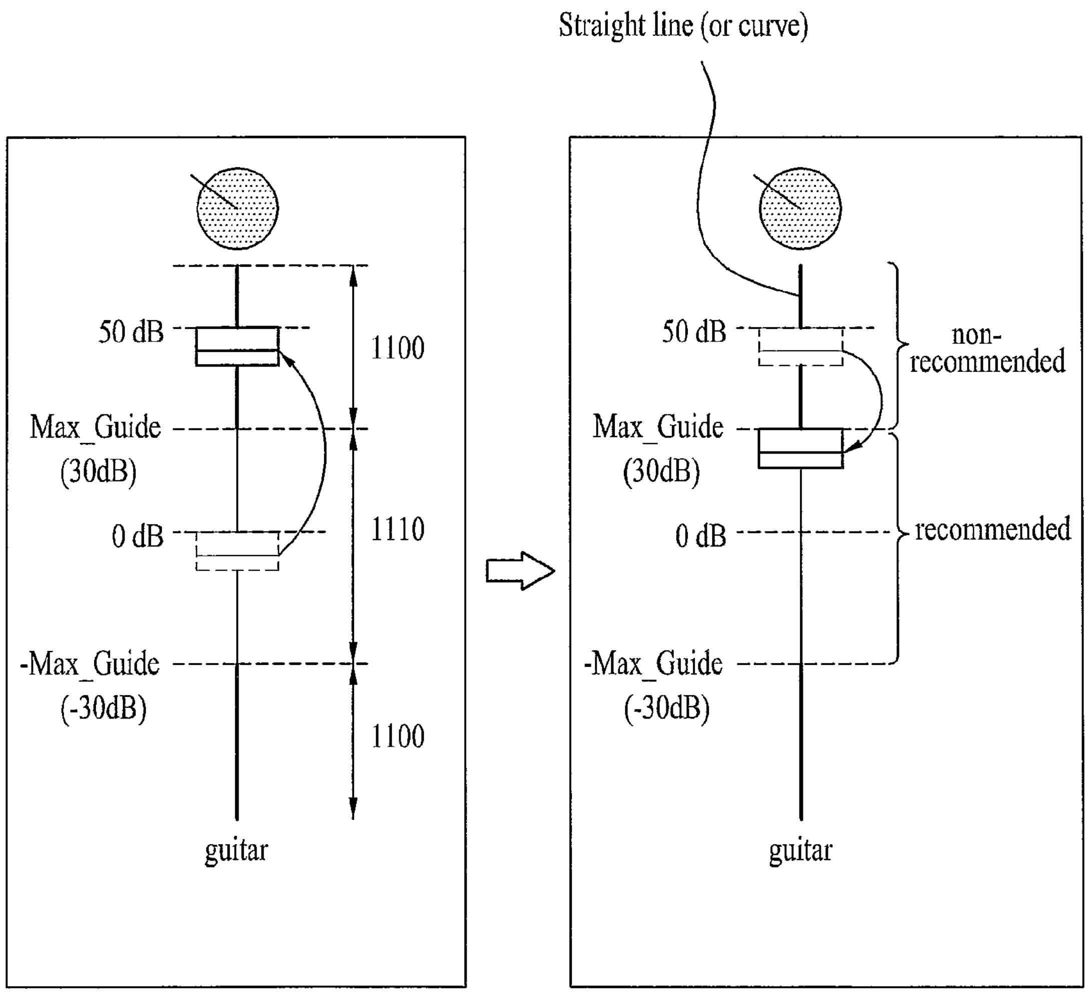
FIG. 11 shows a method of displaying representation corresponding to modified mix information according to one embodiment of the present invention.

FIG. 11 shows a method of displaying representation corresponding to modified mix information according to one embodiment of the present invention.

As mentioned in the foregoing description with reference to FIG. 5, a graphic user interface according to the present invention is able to display a non-recommended rendering region 1100 for displaying rendering limitation and a recommended rendering region 1110 for displaying a rendering rage except the rendering limitation and is also able to display a level fader for receiving a user input for controlling a level for at least one of a plurality of objects included in a downmix signal.

Referring to (a) of FIG. 11, a user adjusts a level for a guitar object up to the non-recommended rendering region 1100 deviating from the recommended rendering region 1110. If so, referring to (b) of FIG. 11, since a user input for the guitar object corresponds to rendering limitation (i.e., the user input exceeds the rendering limitation range), the user input can be changed into the rendering range.

In particular, when the mix information generated based on the user input is +50 dB, if the mix information is modified based on level guide information (e.g., information indicating a recommended rendering region and a non-recommended rendering region), rebound movement of the level fader can take place up to the recommended rendering region (30 dB).

Meanwhile, in a downmix signal including two objects (object A, object B), when mix information for performing +20 dB on the object A is inputted for example, if an output for the object A is +20 dB based on level guide information and internal operation, the modified mix information and the inputted mix information are equal to each other.

In aspect of the graphic user interface, referring to FIG. 5 for example, a result from raising the level fader corresponding to the object A (e.g., guitar) up to +20 dB appears as it is.

If a user additionally inputs mix information for performing −10 dB on the object B (e.g., vocal), the object A and the object B will be set to have a difference of 20 dB from an original state. If this exceeds the limited range determined in the level guide information, the modified mix information modified from the mix information is internally generated and applied (e.g., the modified mix information is capable of adjusting the object A into +15 dB or the object B into −5 dB).

As mentioned in the foregoing description, the mix information (object A: +20 dB, object B: −10 dB) estimated using the user input and the modified mix information (object A: +15 dB, object B: −5 dB) resulting from applying a value represented as GUI thereto actually based on the estimated mix information are mismatched.

Therefore, the actually applied mix information and the mix information estimated by the user input need to be matched each other by displaying the modified mix information to a user.

Figure 12:
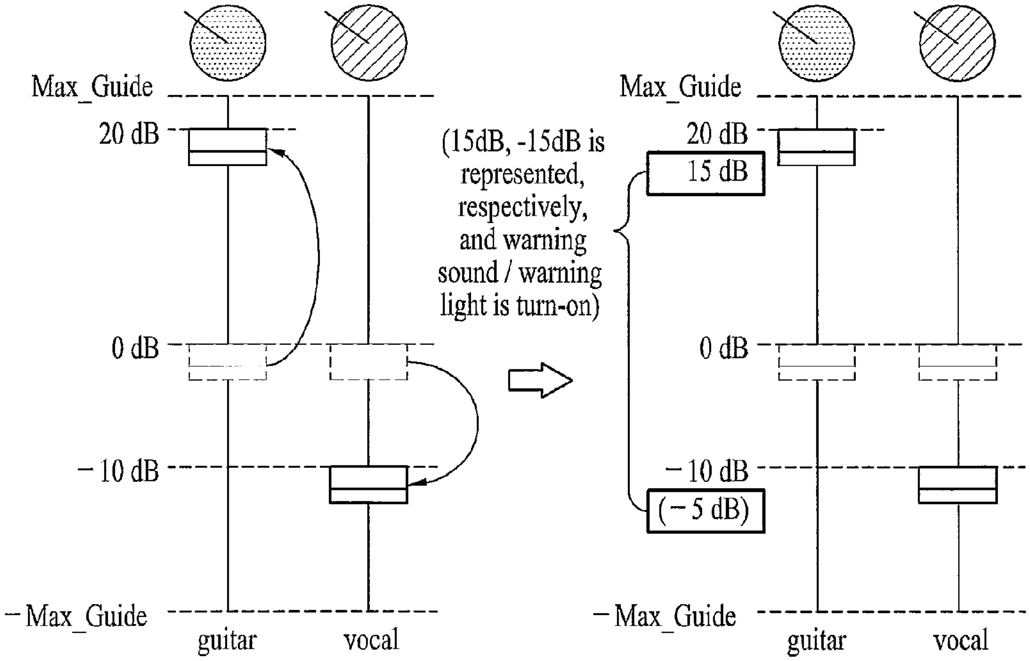
FIG. 12 is a diagram for a method of displaying representation corresponding to modified mix information o according to another embodiment of the present invention.

FIG. 12 is a diagram for a method of displaying representation corresponding to modified mix information o according to another embodiment of the present invention.

Referring to FIG. 12, a user inputs mix information for raising a level fader corresponding to an object A (e.g., guitar) up to +20 dB and performing −10 dB on an object B (e.g., vocal).

In this case, the object A and the object B will be set to have a difference of 30 dB from an original state. If this exceeds the limited range determined in the level guide information, the modified mix information modified from the mix information is internally generated and applied (e.g., the modified mix information is capable of adjusting the object A into +15 dB and the object B into −5 dB).

In this case, it is able to display the representation corresponding to the modified mix information.

A method of displaying modified mix information on a GUI according to one embodiment of the present invention is able to use a method of displaying the modified mix information in form of a level fader, by which the present invention is non-limited.

In this case, the representation corresponding to the modified mix information can be displayed on a GUI using a message, a warning sound, a turned-on or turned-off warning light and/or the like.

Although the present invention relates to a case of modifying mix information in association with a level of object, it can be identically applied to a case of panning of object as well.

Figure 13:
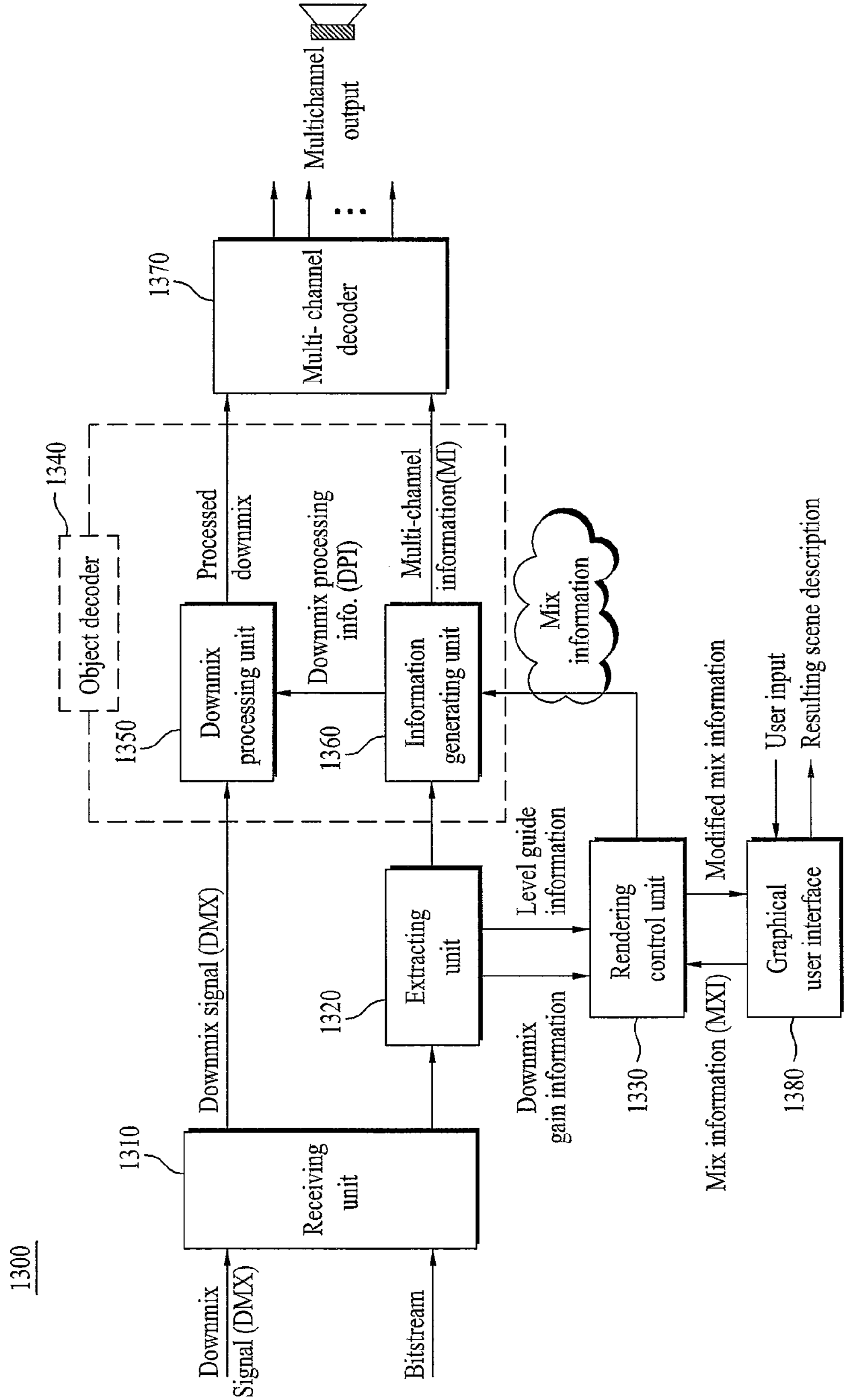
FIG. 13 is a block diagram for a configuration of an audio signal processing apparatus including a graphic user interface according to a further embodiment of the present invention.

FIG. 13 is a block diagram for a configuration of an audio signal processing apparatus including a graphic user interface according to a further embodiment of the present invention.

Referring to FIG. 13, an audio signal processing apparatus 1300 according to a further embodiment of the present invention has the same configuration of the former audio signal processing apparatus described with reference to FIG. 10.

A receiving unit 1310, an extracting unit 1320, a rendering control unit 1330, an object decoder 1340, a downmix processing unit 1350, an information generating unit 1360, a multichannel decoder 1370 and a graphic user interface 1380 in FIG. 13 have the same configurations and functions of the identically-named components shown in FIG. 10, respectively, of which details are omitted from the following description for clarity.

Referring to FIG. 13, the graphic user interface 1380 receives a user input for adjusting a level of at least one object. Mix information estimated by the user input is then inputted to the rendering control unit 1330.

The audio signal processing apparatus 1300 according to a further embodiment of the present invention can be described in a manner that modified mix information is displayed as a GUI only for a screen display without being used in actually adjusting a level and panning of an output audio signal.

For instance, the same description can be made in the following manner using the former example explained with reference to FIG. 12.

First of all, a user inputs mix information for raising a level fader corresponding to an object A (e.g., guitar) up to +20 dB and performing −10 dB on an object B (e.g., vocal).

In this case, the object A and the object B will be set to have a difference of 30 dB from an original state. Even if this exceeds the limited range determined in the level guide information, the mix information will be internally applied as it is. Yet, by displaying the modified mix information (e.g., the modified mix information is capable of adjusting the object A into +15 dB and the object B into −5 dB) as a level fader or a text (character or numeral) on a GUI, a user is enabled to check the modified mix information.

Figure 14:
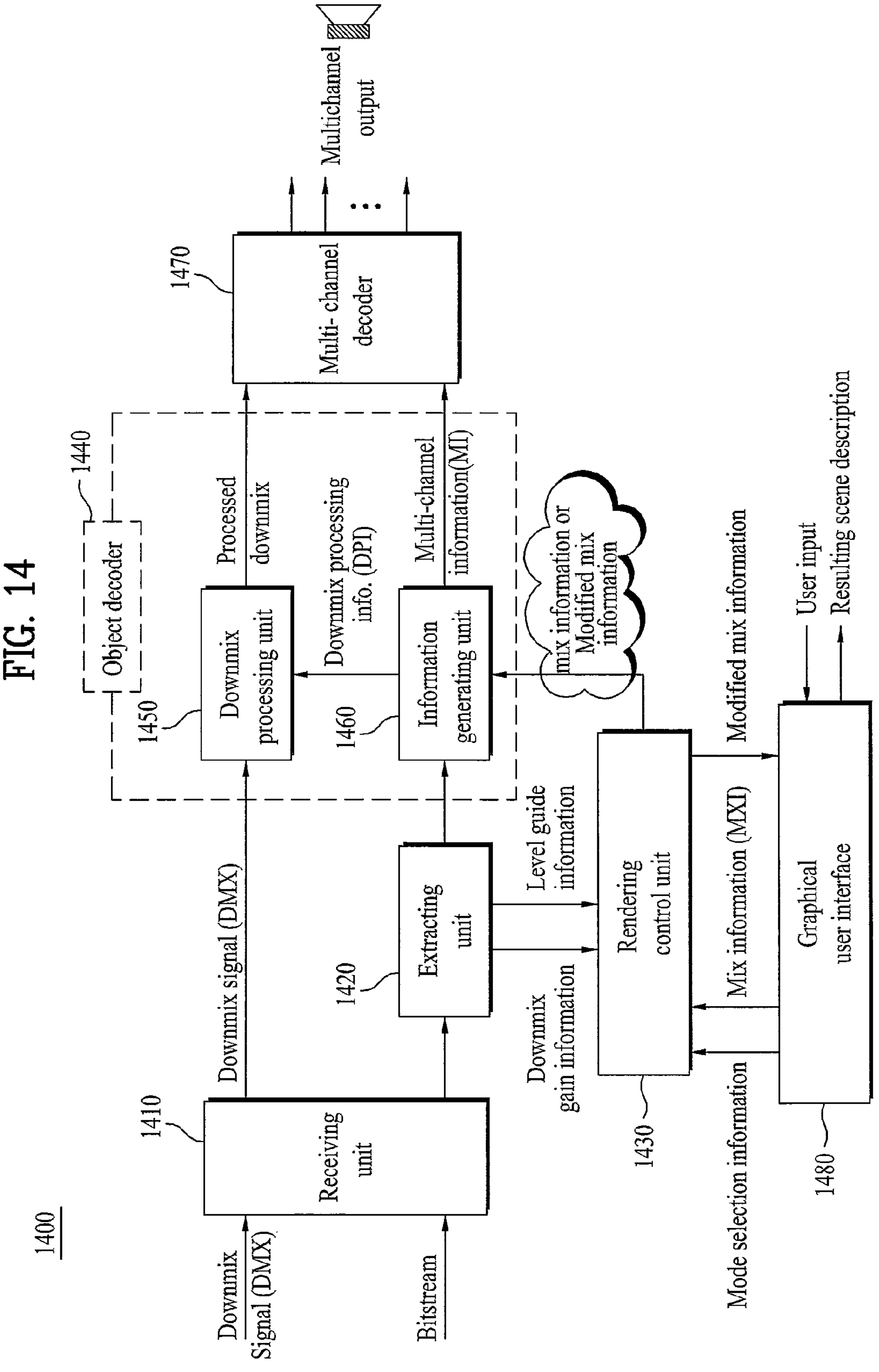
FIG. 14 is a block diagram for a configuration of an audio signal processing apparatus including a graphic user interface according to another further embodiment of the present invention.

FIG. 14 is a block diagram for a configuration of an audio signal processing apparatus including a graphic user interface according to another further embodiment of the present invention.

Referring to FIG. 14, an audio signal processing apparatus 1400 according to another further embodiment of the present invention has the almost same configuration of the former audio signal processing apparatus 1400 described with reference to FIG. 13.

A receiving unit 1410, an extracting unit 1420, an object decoder 1440, a downmix processing unit 1450, an information generating unit 1460 and a multichannel decoder 1470 in FIG. 14 have the same configurations and functions of the identically-named components shown in FIG. 13, respectively, of which details are omitted from the following description for clarity.

The rendering control unit 1430 receives mix information and then modifies the mix information based on the level guide information according to the mix information and mode selection information for selecting a limiting mode or a non-limiting mode, thereby outputting one of the modified mix informations.

Therefore, a user is able to input the mode selection information to the graphic user interface 1480. Through this, the rendering control unit 1480 outputs either the mix information or the modified mix information to the information generating unit 1460. The information generating unit 1460 is then able to generate at least one of downmix processing information and multichannel information based on object information and either the mix information or the modified mix information.

Meanwhile, as mentioned in the foregoing description, the graphic user interface 1480 included in the audio processing apparatus 1400 according to the present invention is able to display representation corresponding to the modified mix information.

Figure 15:
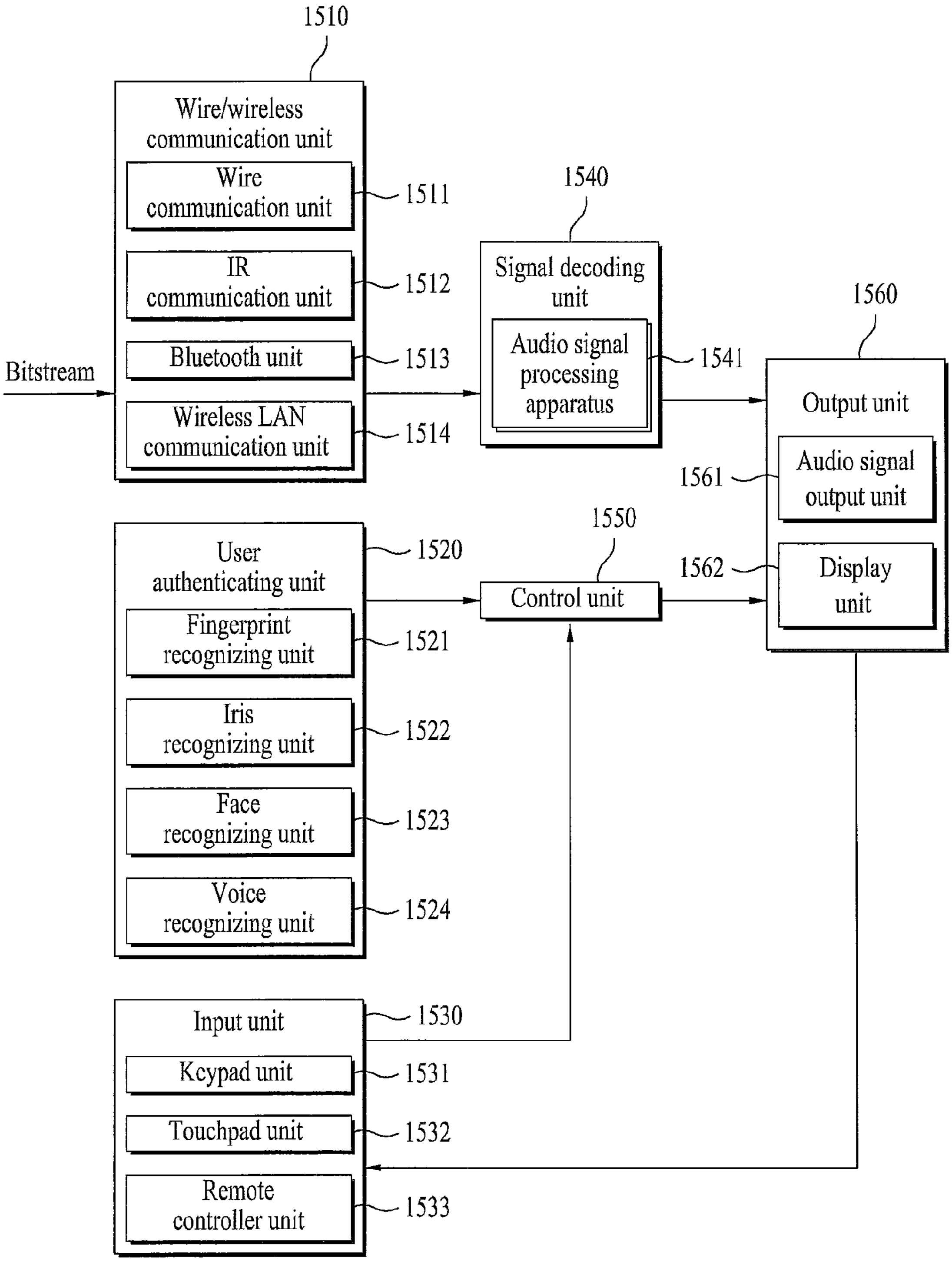
FIG. 15 is a schematic block diagram of a product in which an audio signal processing apparatus according to one embodiment of the present invention is implemented.
Figure 16:
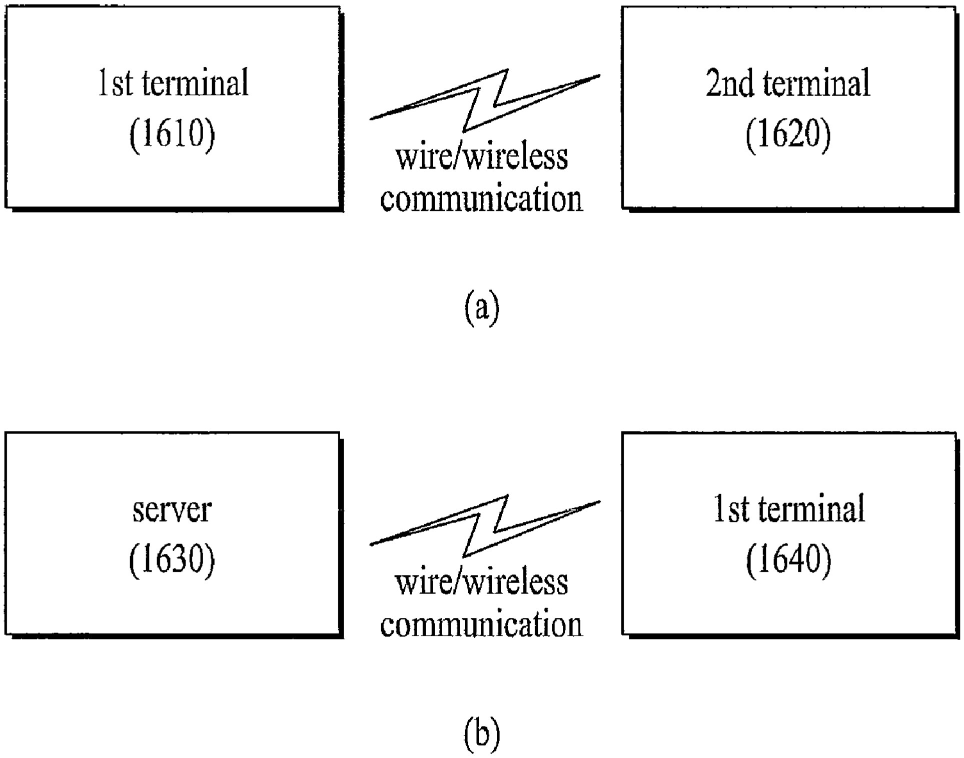
FIG. 16A and FIG. 16B are diagrams for relations of products each of which is provided with an audio signal processing apparatus according to one embodiment of the present invention.

FIG. 15 is a schematic block diagram of a product in which an audio signal processing apparatus according to one embodiment of the present invention is implemented. And, FIG. 16A and FIG. 16B are diagrams for relations of products each of which is provided with an audio signal processing apparatus according to one embodiment of the present invention.

Referring to FIG. 15, a wire/wireless communication unit 1510 receives a bitstream via wire/wireless communication system. In particular, the wire/wireless communication unit 1510 can include at least one of a wire communication unit 1511, an infrared unit 1512, a Bluetooth unit 1513 and a wireless LAN unit 1514.

A user authenticating unit 1520 receives an input of user information and then performs user authentication. The user authenticating unit 1520 can include at least one of a fingerprint recognizing unit 1521A, an iris recognizing unit 1522, a face recognizing unit 1523 and a voice recognizing unit 1524. The fingerprint recognizing unit 1521, the iris recognizing unit 1522, the face recognizing unit 1523 and the voice recognizing unit 1524 receive fingerprint information, iris information, face contour information and voice information and then convert them into user informations, respectively. Whether each of the user informations matches pre-registered user data is determined to perform the user authentication.

An input unit 1530 is an input device enabling a user to input various kinds of commands and can include at least one of a keypad unit 1531, a touchpad unit 1532 and a remote controller unit 1533, by which the present invention is non-limited.

Meanwhile, in case that an audio signal processing apparatus 1541 generates at least one of mix information and modified mix information, and the mix information or the modified mix information are displayed on a screen via a display unit 1562, a user is able to adjust the mix information through the input unit 1530. The corresponding information is inputted to a control unit 1550.

A signal decoding unit 1540 includes the audio signal processing apparatus 1541. The signal decoding unit 1540 generates at least one of downmix processing information and multichannel information based on object information and at least one of the mix information and the modified information.

The control unit 1550 receives input signals from input devices and controls all processes of the signal decoding unit 1540 and an output unit 1560.

In particular, the output unit 1560 is an element configured to output an output signal generated by the signal decoding unit 1540 and the like and can include a speaker unit 1561 and a display unit 1562. If the output signal is an audio signal, it is outputted via the speaker unit 1561. If the output signal is a video signal, it is outputted via the display unit 1562.

FIG. 16A and FIG. 16B are diagrams for relations of products each of which is provided with an audio signal processing apparatus according to one embodiment of the present invention. Referring to FIG. 16A, it can be observed that a first terminal 1610 and a second terminal 1620 can exchange data or bitstreams bi-directionally with each other via the wire/wireless communication units. The data or bitstreams exchanged via the wire/wireless communication units may include the bitstreams generated by the present invention shown in FIG. 1 or the data including level guide flag information, level guide information and the like of the present invention described with reference to FIGS. 1 to 15. Referring to FIG. 16B, it can be observed that a server 1630 and a first terminal 1640 can perform wire/wireless communication with each other as well.

Industrial Applicability

Accordingly, the present invention is applicable to audio signal encoding/decoding.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing an audio signal, comprising:

receiving a downmix signal comprising plural objects, and a bitstream including object information and downmix gain information;

obtaining level guide flag information indicating whether level guide information is present in the bitstream;

obtaining the level guide information representing a limitation of object level applied to at least one object of the plural objects, from the bitstream, based on the level guide flag information;

receiving mix information;

generating modified mix information by modifying the mix information based on the level guide information and the downmix gain information; and generating at least one of downmix processing information and multi-channel information based on the modified mix information and the object information, wherein the mix information is used for controlling object level for at least one object of the plural objects, and wherein the object information and the downmix gain information are determined when the downmix signal is generated.

2. The method of claim 1, wherein the level guide flag information is obtained from a header of the bitstream.

3. The method of claim 1, further comprising:

obtaining level guide flag information for each frame indicating whether level guide information is present in a frame data of the bitstream, wherein the level guide information is obtained from the frame data of the bitstream, and is to be applied to a current frame corresponding to the frame data.

4. The method of claim 1, wherein the level guide information corresponds to a fixed bit length, and the method further comprises:

de-quantizing the level guide information into a level guide parameter using a quantization table, wherein the modified mix information is generated by modifying the mix information based on the level guide parameter and the downmix gain information.

5. The method of claim 1, wherein:

the object information includes at least one of object level information and object correlation information, the downmixing processing information is to process the downmix signal without change of a number of channels, the multi-channel information includes at least one of channel level difference, inter channel correlation and channel prediction coefficient, the mix information is further used for controlling object panning for all or a part of the at least one object, and the downmix gain information is a gain value applied to at least one object when the downmix signal is generated.

6. The method of claim 1, further comprising:

generating a processed downmix signal using the downmix signal and the downmix processing information; and generating a multi-channel signal based on the processed downmix signal and the multi-channel information.

7. The method of claim 1, wherein the level guide information includes a common limitation applied to all of the plural objects.

8. The method of claim 1, wherein the level guide information includes an individual limitation applied to each of the plural objects.

9. An apparatus for processing an audio signal, comprising:

a receiving unit configured to receive a downmix signal comprising plural objects, and a bitstream including object information and downmix gain information;

an extracting unit configured to obtain level guide flag information indicating whether level guide information is present in the bitstream, and to obtain the level guide information representing a limitation of object level applied to at least one object of the plural objects, from the bitstream, based on the level guide flag information;

a rendering control unit configured to receive mix information, and to generate modified mix information by modifying the mix information based on the level guide information and the downmix gain information; and an information generating unit configured to generate at least one of downmix processing information and multi-channel information based on the modified mix information and the object information, wherein the mix information is used for controlling object level for at least one object of the plural objects, and wherein the object information and the downmix gain information are determined when the downmix signal is generated.

10. The apparatus of claim 9, wherein the level guide flag information is obtained from a header of the bitstream.

11. The apparatus of claim 9, wherein the extracting unit further obtains level guide flag information for each frame indicating whether level guide information is present in a frame data of the bitstream, wherein the level guide information is obtained from the frame data of the bitstream, and is to be applied to a current frame corresponding to the frame data.

12. The apparatus of claim 9, wherein the level guide information corresponds to a fixed bit length, wherein the extracting unit de-quantizes the level guide information for all frames into a level guide parameter using a quantization table, and wherein the modified mix information is generated by modifying the mix information based on the level guide parameter and the downmix gain information.

13. The apparatus of claim 9, wherein:

the object information includes at least one of object level information and object correlation information, the downmixing processing information is to process the downmix signal without change of a number of channels, the multi-channel information includes at least one of channel level difference, inter channel correlation and channel prediction coefficient, the mix information is further used for controlling object panning for all or a part of the at least one object, and the downmix gain information is a gain value applied to at least one object when the downmix signal is generated.

14. The apparatus of claim 9, further comprising:

a downmix processing unit configured to generate a processed downmix signal using the downmix signal and the downmix processing information; and a multi-channel decoder configured to generate a multi-channel signal based on the processed downmix signal and the multi-channel information.

15. The apparatus of claim 9, wherein the level guide information includes a common limitation applied to all of the plural objects.

16. The apparatus of claim 9, wherein the level guide information includes an individual limitation applied to each of the plural objects.

* * * * *